United States Patent
Lei et al.

(10) Patent No.: US 11,315,033 B2
(45) Date of Patent: Apr. 26, 2022

(54) MACHINE LEARNING COMPUTER SYSTEM TO INFER HUMAN INTERNAL STATES

(71) Applicant: HITACHI, LTD., Tokyo (JP)

(72) Inventors: Miaomei Lei, Tokyo (JP); Toshinori Miyoshi, Tokyo (JP); Hiroki Sato, Tokyo (JP)

(73) Assignee: HITACHI, LTD., Tokyo (JP)

(*) Notice: Subject to any disclaimer, the term of this patent is extended or adjusted under 35 U.S.C. 154(b) by 713 days.

(21) Appl. No.: 15/928,281

(22) Filed: Mar. 22, 2018

(65) Prior Publication Data

US 2019/0042978 A1   Feb. 7, 2019

(30) Foreign Application Priority Data

Aug. 4, 2017   (JP) .............................. JP2017-151763

(51) Int. Cl.
  *G06N 20/00*   (2019.01)
  *G06N 5/04*   (2006.01)

(52) U.S. Cl.
  CPC .............. *G06N 20/00* (2019.01); *G06N 5/046* (2013.01)

(58) Field of Classification Search
  CPC ................................ G06N 20/00; G06N 5/046
  See application file for complete search history.

(56) References Cited

U.S. PATENT DOCUMENTS

| 9,031,331 B2* | 5/2015 | Mensink | G06K 9/6232 |
| | | | 382/224 |
| 2014/0343966 A1* | 11/2014 | Miyoshi | G16H 50/20 |
| | | | 705/3 |
| 2017/0039345 A1* | 2/2017 | Roder | G01N 33/5743 |

FOREIGN PATENT DOCUMENTS

| JP | 2011-150408 A | 8/2011 |
| JP | 2014-225175 A | 12/2014 |
| JP | 2016-106689 A | 6/2016 |

OTHER PUBLICATIONS

Lunga, "Multidimensional Artificial Field Embedding With Spatial Sensitivity", IEEE, vol. 52, Feb. 2014 (Year: 2014).*
Kokiopoulou, "Enhanced graph-based dimensionality reduction with repulsion Laplaceans", 2009 (Year: 2009).*
Stella Yu, "Segmentation with Pairwise Attraction and Repulsion", IEEE, 2001 (Year: 2001).*

(Continued)

*Primary Examiner* — Ann J Lo
*Assistant Examiner* — Van C Mang
(74) *Attorney, Agent, or Firm* — Baker Botts L.L.P.

(57) ABSTRACT

A computer system includes a storage device and a processor configured to operate in accordance with command codes stored in the storage device. The processor places a plurality of feature vectors including feature vectors each provided with a label in a feature space. The processor determines forces among the plurality of feature vectors determined from repulsions and attractions between feature vectors. A repulsion is defined to be larger when a distance between the feature vectors is shorter, and an attraction is defined to be larger when the feature vectors have a predetermined relationship. The processor rearranges the plurality of feature vectors to reduce potential energy of the feature space determined by the forces among the plurality of feature vectors. The processor outputs at least a part of the plurality of rearranged feature vectors as data to be used for data analysis.

12 Claims, 9 Drawing Sheets

(56) References Cited

OTHER PUBLICATIONS

Veysel Gazi, "A class of attractions/repulsion functions for stable swarm aggregations", 2004 (Year: 2004).*
Lunga, "Multidimensional Artificial Field Embedding With Spatial Sensitivity" (Year: 2013).*
Lise, "Prediction of hot spot residues at protein-protein interfaces by combining machine learning and energy-based methods" (Year: 2009).*
Yang Yong, "Facial Expression Recognition and Tracking Based on Distributed Locally Linear Embedding and Expression Motion Energy", 2006 (Year: 2006).*
Y. Inoue, et al., "Feature Analysis of Auditory Evoked Potentials by Statistical Discrimination", The Institute of Electronics, Information and Communication Engineers, IEICE Technical Report, vol. 107, No. 413, NC2007-94, pp. 43-48, Jan. 2008 (English abstract attached).

* cited by examiner

FEATURE VECTOR RESULT OUTPUT 501

|  | $r_1$ | $r_2$ | ...... | $r_{945}$ | $r_{946}$ |
|---|---|---|---|---|---|
| FEATURE VECTOR $R_1$ | 0.957017 | 0.922537 | ...... | 0.687052 | 0.825379 |
| FEATURE VECTOR $R_2$ | 0.620861 | 0.4765 | ...... | 0.757881 | 0.645026 |
| FEATURE VECTOR $R_3$ | 0.503688 | 0.8085 | ...... | 0.727771 | 0.03386 |
| FEATURE VECTOR $R_4$ | 0.783795 | 0.796088 | ...... | 0.81507 | -0.20657 |
| FEATURE VECTOR $R_5$ | 0.950644 | 0.928595 | ...... | 0.911641 | 0.91461 |

FEATURE VECTOR SIMILARITY INFORMATION 701

|     | $R_1$ | $R_2$ | $R_3$ | ...... |
|-----|-------|-------|-------|--------|
| $R_1$ | -   | 0.23  | 0.67  | ...... |
| $R_2$ | -   | -     | 0.43  | ...... |
| $R_3$ | -   | -     | -     | ...... |
| ...... | ...... | ...... | ...... | ...... |

MACHINE LEARNING COMPUTER SYSTEM TO INFER HUMAN INTERNAL STATES

CLAIM OF PRIORITY

The present application claims priority from Japanese patent application JP2017-151763 filed on Aug. 4, 2017, the content of which is hereby incorporated by reference into this application.

BACKGROUND

This invention relates to technology of data analysis.

In recent years, advancement of various types of sensors has prompted studies utilizing human biological data, such as the study of inferring a human internal state like understanding level or emotion and the study of interactions between persons. If inferring a human internal state is available, services suitable for the internal state can be provided, so that people can have more comfortable lives. If inferring an interaction between persons is available, mutual understanding is expedited to assist improvement of the intelligent productivity of an organization or a society.

Background arts in this field of technology includes JP 2016-106689 A, which states: An emotion information estimation device 1 estimates the emotion information of a user on the basis of living body information of the user. The emotion information estimation device includes: an estimator generating unit 360 for generating an estimator by learning a relationship between the living body information and the emotion information on the basis of a history storage database 350 storing the living body information of the user acquired previously, the emotion information of the user corresponding to this living body information and a physical state, and for estimating the emotion information from the living body information every physical state; a state determination unit 390 for determining the physical state of the user on the basis of the position information of the user and the living body information of the user detected at the time point when this position information is acquired; and an emotion determination unit 395 for estimating the emotion information of the user from the living body information of the user detected by using the estimator corresponding to the physical state of the determined user among the estimator every created physical state (Abstract).

SUMMARY

The traditional machine learning requires that a variety of biological data be used as input data for a classifier to accurately infer a human internal state. The variety of biological data can be multichannel data measured from the brain, image data of expressions, and data on the line of sight.

However, such a variety of biological data increases the number of dimensions of data. The traditional machine learning requires that the following two conditions are satisfied together: the condition that the number (d) of dimensions of data input to a classifier is small and the condition that the number (N) of already labelled data samples to be used in the learning is large. For example, the number N of data samples required for learning is $10^d$.

Accordingly, demanded is a technique to increase the accuracy of inferring a right answer from a limited amount of data set.

An aspect of this disclosure is a computer system including a storage device and a processor configured to operate in accordance with command codes stored in the storage device. The processor is configured to place a plurality of feature vectors including feature vectors each provided with a label in a feature space. The processor is configured to determine forces among the plurality of feature vectors determined from repulsions and attractions between feature vectors. A repulsion is defined to be larger when a distance between the feature vectors is shorter, and an attraction is defined to be larger when the feature vectors have a predetermined relationship. The processor is configured to rearrange the plurality of feature vectors to reduce potential energy of the feature space determined by the forces among the plurality of feature vectors. The processor is configured to output at least a part of the plurality of rearranged feature vectors as data to be used for data analysis.

An aspect of this disclosure increases the accuracy of inferring a right answer from a limited amount of data set.

Problems, configurations, and effects other than those described above are clarified in the following description of embodiments.

DETAILED DESCRIPTION OF THE EMBODIMENTS

Figure 1:
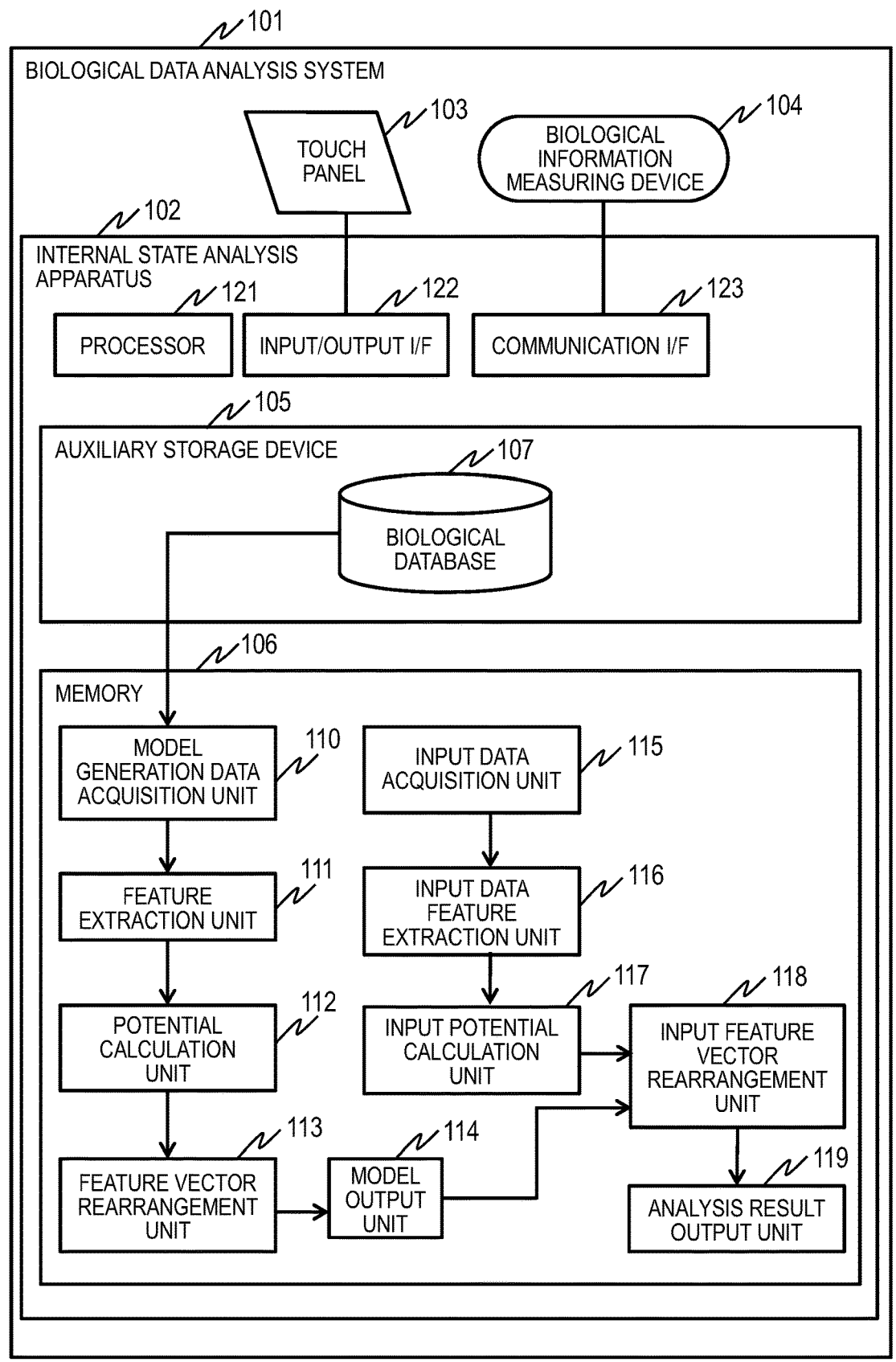
FIG. 1 is a block diagram for illustrating a configuration example of a biological data analysis system in Embodiment 1.

Hereinafter, embodiments of this invention will be described with reference to the accompanying drawings. It should be noted that the embodiments are merely examples to implement this invention and is not to limit the technical scope of this invention. Elements common to the drawings are denoted by the same reference signs.

Described in the following is a technique to generate data to be used in machine learning. The data generated to be used in machine learning includes components of the model of the machine learning and training data (learning data) for the model. The technique of this disclosure defines force between feature vectors in a feature vector space. The force includes attraction and repulsion based on the relationship between the feature vectors. The attractions and the repulsions between feature vectors arranged in the feature vector space determine gross potential energy of the plurality of feature vectors.

The technique of this disclosure rearranges the plurality of feature vectors in the feature vector space so that the gross potential energy of the plurality of feature vectors becomes smaller. An example of the technique rearranges the plurality of feature vectors so that the gross potential energy becomes minimum. All or a part of the plurality of feature vectors have labels of right answers assigned thereto.

The plurality of rearranged feature vectors can be used as a training data set for a specific machine learning model or components of the machine learning model. The plurality of feature vectors to be rearranged can include a feature vector (referred to as feature vector of interest) of an instance (input data) to infer a label (a class or a numerical value). Through rearrangement of the plurality of feature vectors including the feature vector of interest, the value of the label for the feature vector of interest is determined (inferred).

This technique can increase the accuracy of inferring a right answer from a limited amount of high-dimensional data set. For example, using the plurality of rearranged feature vectors as training data leads to a more appropriately trained model. Using the plurality of rearranged feature vectors in the model leads to more accurate inference of a label for an input to the model.

The technique of this disclosure is applicable to any types of input data and is applicable to machine learning for either regression problems or classification problems. In the following, an example of machine learning of human biological data is described. The evaluation system analyzes the human biological data to identify the internal state of the person, such as emotion or understanding level, or to indicate an emotional interaction between persons.

Embodiment 1

Hereinafter, a biological data analysis system, specifically, a system for inferring a human internal state is described as an example of a machine learning system. An example of the biological data to be used is brain activity measurement data and an example of the human internal state is the proficiency level in a foreign language. For example, a label assigned to one instance of brain activity measurement data indicates high proficiency or low proficiency in the foreign language. The biological data analysis system infers high or low proficiency in the foreign language based on the input brain activity measurement data.

FIG. 1 is a block diagram for illustrating a configuration example of a biological data analysis system. The biological data analysis system 101 includes an internal state analysis apparatus 102, a touch panel 103, and a biological information measuring device 104. The internal state analysis apparatus 102 is configured with a computer including a processor (CPU) 121, an auxiliary storage device 105, a memory 106, an input/output interface 122, and a communication interface 123.

The processor 121 executes programs stored in the memory 106. The memory 106 includes a ROM of a non-volatile memory unit and a RAM of a volatile memory unit. The ROM stores invariable programs (for example, the BIOS). The RAM can be a high-speed and volatile memory unit like a dynamic random access memory (DRAM) and stores programs to be executed by the processor 121 and data to be used by the processor 121 in executing the programs.

The auxiliary storage device 105 is a high-capacity and non-volatile storage device such as a magnetic storage device or a flash memory and stores programs to be executed by the processor 121 and data to be used by the processor 121 in executing the programs. Typically, data stored in the auxiliary storage device 105 is loaded to the memory 106. Each of the auxiliary storage device 105, the memory 106, and the combination thereof is a storage device.

The input/output interface 122 is an interface connected with a touch panel 103 to receive an input from the operator and output a result of execution of a program in a form that can be seen by the operator. The input/output interface 122 can also be connected with input devices such as a keyboard, a mouse, and a microphone and output devices such as a display device, a printer, and a speaker.

The communication interface 123 is a network interface device for controlling communication with other apparatuses in accordance with a predetermined protocol. The communication interface 123 includes a serial interface such as USB. The communication interface 123 is connected with the biological information measuring device 104, for example.

In this embodiment, the biological information measuring device 104 measures biological information in a plurality of brain regions of a user. The biological information measuring device 104 may measure biological information in parts other than the brain. A device for measuring the variation in cerebral blood volume by near-infrared spectroscopy is an example of the biological information measuring device 104. The biological information measuring device 104 may acquire information on the brain function by a different measuring methodology, for example by measuring the magnetic field. The biological information measuring device 104 can be a camera or an eye tracking system; in these cases, the device 104 acquires biological information such as expressions or the lines of sight.

The programs to be executed by the processor 121 are provided to the internal state analysis apparatus 102 through a removable medium such as a CD-ROM or a flash memory or via a network and stored to the non-volatile auxiliary storage device 105 of a non-transitory storage medium. For that purpose, it is preferable that the internal state analysis apparatus 102 include an interface to retrieve data from a removable medium.

The internal state analysis apparatus 102 is a computer system configured with a physically single computer or a computer system logically and physically configured with a plurality of computers; the system may operate on a separate thread of a single computer or on a virtual computer constructed on resources of a plurality of physical computers.

The auxiliary storage device 105 stores a biological database 107. The biological database 107 stores data representing a state of a person in a specified period. The state is indicated by time-series data on a biological indicator or text data of a result of medical interview, for example, and is expressed by a vector of a plurality of numerical components. All or a part of the vectors stored in the biological database 107 have labels assigned thereto. The data stored in the biological database 107 includes data acquired from the biological information measuring device 104 and/or biological data prepared in advance.

The memory 106 holds a model generation data acquisition unit 110, a feature extraction unit 111, a potential calculation unit 112, a feature vector rearrangement unit 113, a model output unit 114, an input data acquisition unit 115, an input data feature extraction unit 116, an input potential calculation unit 117, an input feature vector rearrangement unit 118, and an analysis result output unit 119. These units are all programs.

The programs are executed by the processor 121 to perform predetermined processing with the storage device and the communication ports (communication devices). Accordingly, a description in this embodiment having a subject of program can be replaced by a description having a subject of the processor 121. Alternatively, processing performed by a program can be processing performed by the computer and the computer system which run the program.

The processor 121 operates in accordance with a program to work as a functional unit (means) to implement a predetermined function. For example, the processor 121 operates in accordance with a program of the model generation data acquisition unit 110 to function as a model generation data acquisition unit (means to acquire data to generate a model). The same applies to the other programs. Moreover, the processor 121 also works as functional units (means) to implement different processing executed by each program. The computer and the computer system are an apparatus and a system including these functional units (means).

The model generation data acquisition unit 110 acquires data samples (vectors) in a plurality of states from the biological database 107 to generate a model. The data samples to be acquired are provided with state labels (of right answers). A part of the data samples does not need to be provided with a state label. If all samples are provided with state labels, the later-described rearrangement of feature vectors can be performed more appropriately.

The plurality of states are the states of one or more subjects. In the following description, the plurality of states are the states of different subjects. The biological data indicating the state of a single subject includes data measured at one or more parts with one or more types of sensors.

The biological data and state labels are described. For example, the model generation data acquisition unit 110 acquires time-series brain signals in a plurality of brain regions. The time-series biological information is values of biological information measured at two or more timepoints. The model generation data acquisition unit 110 acquires biological data on brain activity measured in a plurality of brain regions when the subject is listening to a foreign language.

For example, the biological information measuring device 104 measures time-series oxygenated hemoglobin concentration and/or reduced hemoglobin concentration in the blood at a plurality of measurement sites on the brain surface of the subject using near-infrared spectroscopy. The biological information measuring device 104 may measure other biological information. For example, the biological information measuring device 104 may measure brain waves or measure brain functions with functional magnetic resonance imaging. The biological information measuring device 104 may further include an eye-tracking gear or a camera to observe the user's line of sight or expressions.

Figure 2:
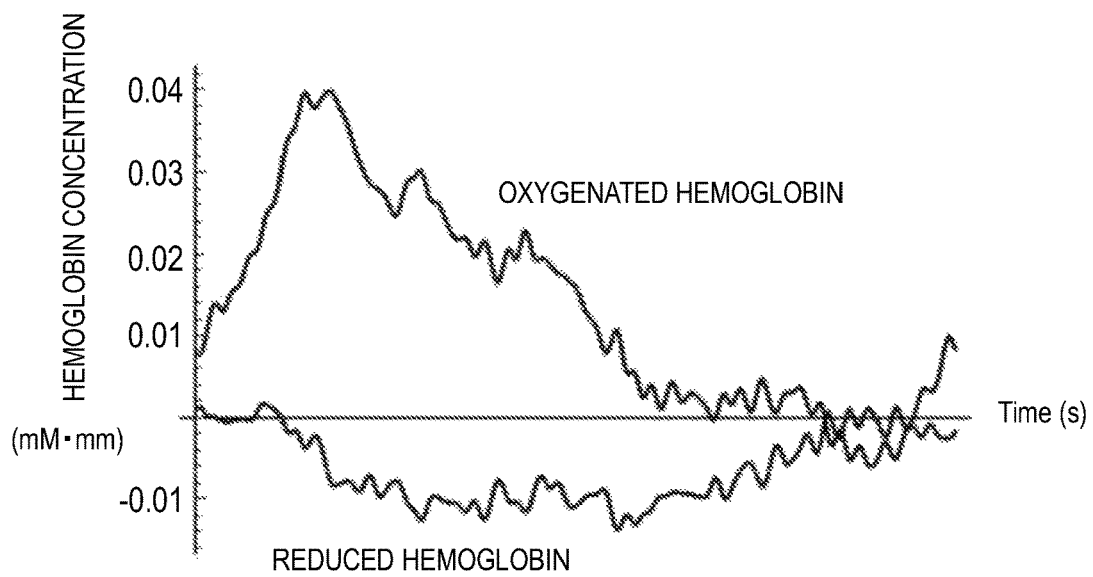
FIG. 2 is an example of time-series hemoglobin concentration data as a kind of biological data in Embodiment 1.

FIG. 2 is an example of hemoglobin concentration data at a single measurement site. The hemoglobin concentration data in FIG. 2 is a time series of oxygenated hemoglobin concentration and reduced hemoglobin concentration of a subject who is listening to a foreign language.

In FIG. 2, the oxygenated hemoglobin concentration starts rising with the start of measurement. The reduced hemoglobin concentration starts dropping with the start of measurement. The biological data of one subject includes data on hemoglobin concentration at a plurality of measurement sites. The model generation data acquisition unit 110 acquires biological data of a plurality of persons.

The state label indicates the subject's proficiency level in a foreign language. For example, a subject is assigned in advance high foreign language proficiency or low foreign language proficiency determined based on the self-report, confidence in the foreign language, experience in abroad, or a previous test score about the foreign language.

The model generation data acquisition unit 110 acquires time-series hemoglobin concentration data taken from a plurality of brain regions of a plurality of subjects and their foreign language proficiency labels from the biological database 107.

Figure 3:
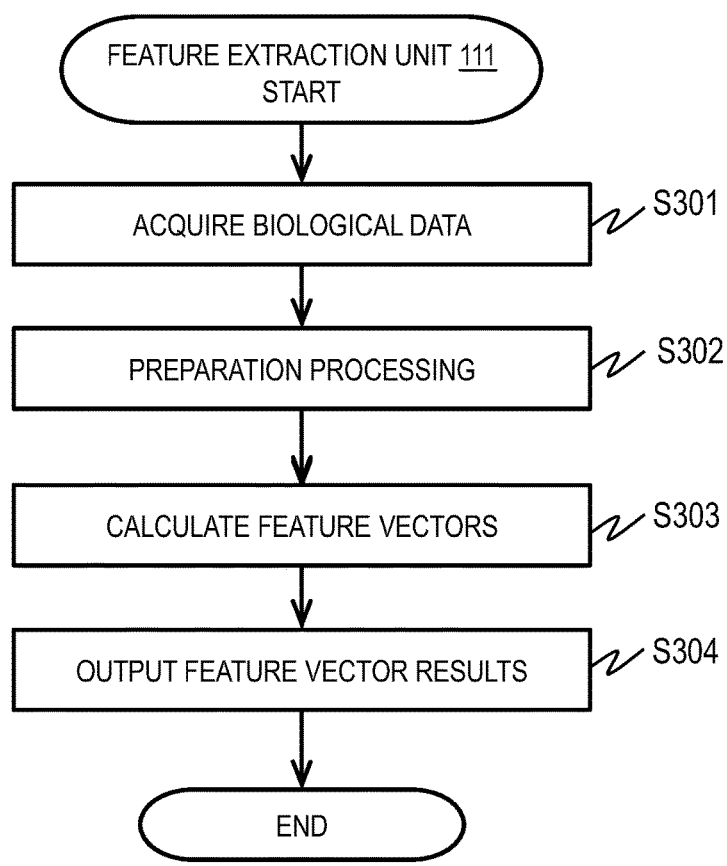
FIG. 3 is a flowchart of an example of feature extraction processing in Embodiment 1.

FIG. 3 is a flowchart of an example of feature extraction processing. The feature extraction unit 111 acquires time-series biological data of a plurality of persons acquired by the model generation data acquisition unit 110 (S301). This description uses an example of time-series hemoglobin concentration data taken from a plurality of brain regions of each person.

After acquiring the biological data, the feature extraction unit 111 performs preparation processing based on the characteristics of the kind of the biological data (S302). An example of the preparation processing is to remove noise. A near-infrared light measuring device measures hemoglobin concentration by a non-invasive optical cephalic hemodynamics measurement technique. Accordingly, the signal acquired by the near-infrared light measuring device includes a signal related to the brain activity and information related to the systemic hemodynamics caused by heart rate variation, for example.

The feature extraction unit 111 removes the information related to the systemic hemodynamics caused by heart rate variation as noise. The feature extraction unit 111 performs processing such as frequency bandpass filtering, polynomial baseline correction, principal component analysis, and independent component analysis onto the acquired hemoglobin concentration data as preparation processing.

The feature extraction unit 111 may use only the oxygenated hemoglobin signal, only the reduced hemoglobin signal, or the sum of the oxygenated hemoglobin signal and the reduced hemoglobin signal (total hemoglobin signal) as the signal representing the time-series biological information.

Subsequently, the feature extraction unit 111 performs processing to calculate feature vectors (S303). For example, the feature extraction unit 111 calculates a correlation coefficient of time-series signals at a plurality of measurement sites as a feature value. The feature extraction unit 111 calculates, for each measurement site pair, the correlation coefficient r of time-series hemoglobin concentration data at the two measurement sites using the following formula:

$$r(X, Y) = \frac{\sum_{t=0}^{T}(x_t - \bar{x})(y_t - \bar{y})}{\sqrt{\left(\sum_{t=0}^{T}(x_t - \bar{x})^2\right)(\Sigma_{t=0}^{T}(y_t - \bar{y})^2)}} \quad (1)$$

In the formula (1), X and Y represent time-series hemoglobin concentration data (Hb(t)) at measurement sites x and y, respectively; $x_t$ and $y_t$ represent the values at a time t in the time series at the measurement sites x and y, respectively; and x with an overbar and y with an overbar represent time averages in the time series at the measurement sites x and y, respectively. The time average in the time series can be defined as an average of the values at predetermined time intervals in the time series, for example.

Figures 4, 5:
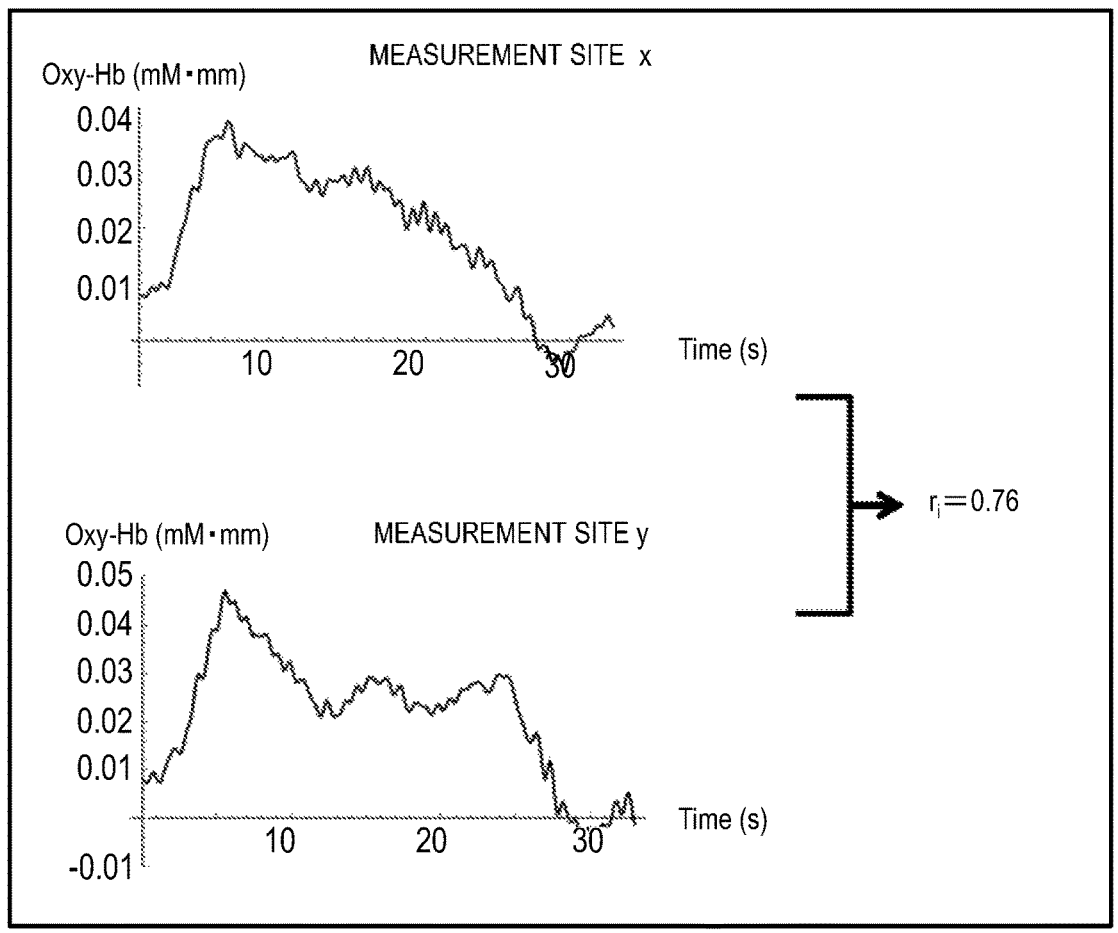
FIG. 4 illustrates an example of a correlation coefficient of time-series oxygenated hemoglobin data at different measurement sites calculated in Embodiment 1.
FIG. 5 is an example of a feature vector result output in Embodiment 1.

Still in the formula (1), t represents a time. The domain of definition for t is $0 \le t \le T$. T represents the time length for which the subject listens to the foreign language. For example, T=30 seconds. To calculate $\Sigma$, the values at the predetermined intervals within $\Sigma$ from t=0 to T are summed up. FIG. 4 illustrates an example of a calculated correlation coefficient of time-series oxygenated hemoglobin concentration data at different measurement sites.

This is an example of calculating a high-dimensional feature vector. A different method of calculating a feature vector can be employed. For example, the feature extraction unit 111 may calculate a mean, a dispersion, or a median of the time-series hemoglobin concentration data as a feature value. As yet another example, the feature extraction unit 111 may calculate the absolute value of the integral of the differences between time-series hemoglobin concentration data at two measurement sites as a relevance degree between the two measurement sites.

In the case of 44 measurement sites per person, the feature extraction unit 111 calculates $44C_2=946$ of different correlation coefficients in calculating a feature vector (S303). The correlation coefficients of the hemoglobin concentration data at a plurality of measurement sites in one person can be expressed as one vector $R_i$, where $R_i=(r_1, r_2, \ldots, r_{945},$ and $r_{946})$.

Subsequently, the feature extraction unit 111 outputs a feature vector result based on the result of calculating feature vectors (S304). The biological data of one person is expressed as a vector $R_i=(r_1, r_2, \ldots, r_{945},$ and $r_{946})$. The feature extraction unit 111 outputs feature vectors of the plurality of persons to generate a model.

FIG. 5 is an example of a feature vector result output 501. The feature vector result output 501 consists of 946-dimensional feature vectors of N persons. The feature extraction unit 111 may use a different method to extract features from the biological data acquired from the model generation data acquisition unit 110. For example, the feature extraction unit 111 can use deep learning of image data to extract features.

Figures 6, 7:
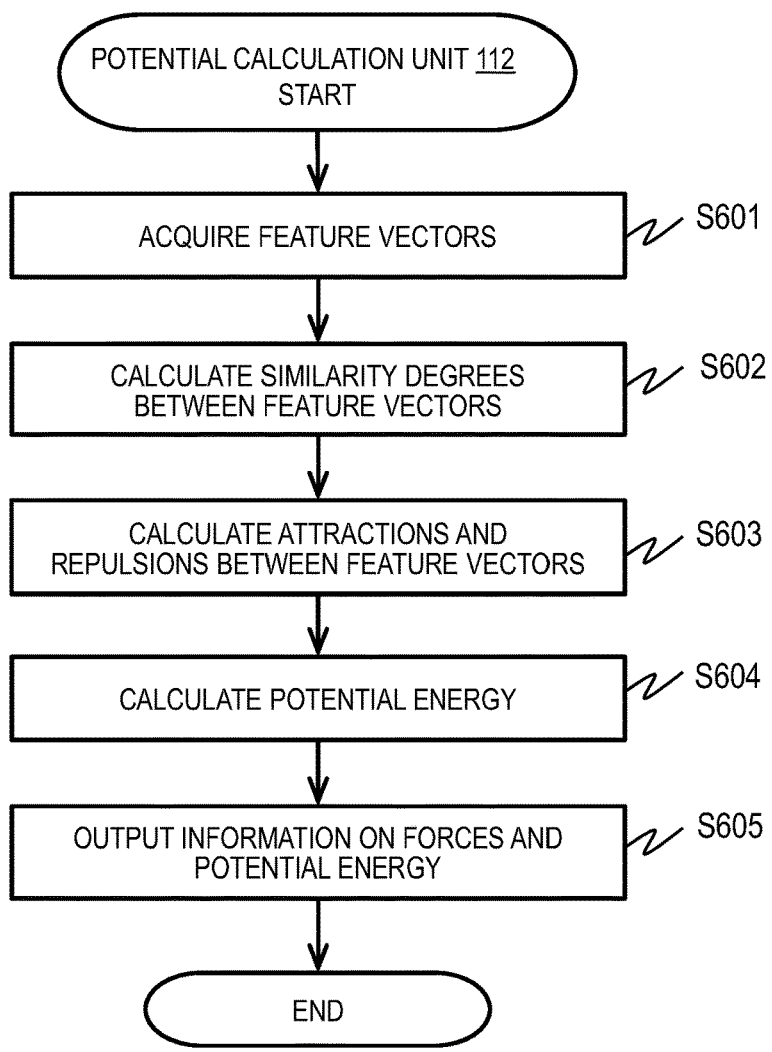
FIG. 6 is a flowchart of an example of potential calculation processing in Embodiment 1.
FIG. 7 is an example of feature vector similarity information in Embodiment 1.

FIG. 6 is an outline flowchart of an example of potential calculation processing. The potential calculation unit 112 calculates potential energy of the feature space based on the feature vectors calculated by the feature extraction unit 111. Each feature vector represents a position (coordinates) in the feature space.

First, the potential calculation unit 112 acquires the feature vectors calculated by the feature extraction unit 111 (S601). Subsequently, the potential calculation unit 112 calculates the similarity degree S of each feature vector pair (S602). The potential calculation unit 112 can calculate the similarity degree $S(R_i, R_j)$ between the i-th and j-th two feature vectors using the following formula:

$$S(R_i, R_j) = \frac{(R_i - m_i)(R_j - m_j)}{\|R_i - m_i\| \|R_j - m_i\|} \quad (2)$$

In the formula (2), $m_i$ is the mean vector of $R_i$; $m_j$ is the mean vector of $R_j$; $R_i$ and $R_j$ are different vectors; and i and j are natural numbers. The values of all components in a mean vector are the same and the value of one component is the mean of the values of all components of the original vector. The foregoing method of calculating the similarity degree S is an example; a different calculation method suitable for the feature vectors can be used.

FIG. 7 is an example of feature vector similarity information 701 output by the potential calculation unit 112. The feature vector similarity information 701 indicates similarity degrees of feature vector pairs each consisting of two different feature vectors. For example, the similarity degree between feature vectors $R_1$ and $R_2$ is 0.23.

In this embodiment, a feature vector R represents the correlation coefficient of hemoglobin concentration data at a plurality of measuring sites of one person. Accordingly, the similarity degree between the feature vector $R_1$ and the feature vector $R_2$ is the similarity degree of brain data of different persons.

The potential calculation unit 112 may calculate the similarity degree $S(R_i, R_j)$ between feature vectors with a predetermined threshold t. For example, if $S(R_i, R_j) \ge t$, $S(R_i, R_j)$ is determined to be 1 or the value of $S(R_i, R_j)$; if $S(R_i, R_j) < t$, $S(R_i, R_j)$ is determined to be 0.

The potential calculation unit 112 may determine the similarity degree $S(R_i, R_j)$ between feature vectors by another method. For example, the potential calculation unit 112 may determine the similarity degrees $S(R_i, R_j)$ from the highest one to the n-th one to be 1 or the value of $S(R_i, R_j)$ and determine the similarity degrees $S(R_i, R_j)$ lower than the n-th one to be 0.

Next, the potential calculation unit 112 calculates attractions and repulsions between feature vectors using the feature vector similarity information 701 (S603). The definitions of the attraction and the repulsion acting between feature vectors are described. The attraction $f_a(R_i, R_j)$ and the repulsion $f_r(R_i, R_j)$ acting between a feature vector $R_i$ and a feature vector $R_j$ are defined by the following formulae (3) and (4), respectively:

$$f_a(R_i, R_j) = \frac{s(R_i, R_j) \times \|R_i - R_j\|^2}{k} + \alpha \quad (3)$$

$$f_r(R_i, R_j) = \frac{ck^2}{\|R_i - R_j\|} \quad (4)$$

In the formulae (3) and (4), $\|R_i - R_j\|$ is a 2-norm (distance) between $R_i$ and $R_j$; C and k are adjustable parameters and are constants determined before the calculation; and $\alpha$ is a value determined in accordance with the labels of $R_i$ and $R_j$.

The attraction is defined based on the similarity degree $S(R_i, R_j)$ between $R_i$ and $R_j$ so that the attraction is proportional to the similarity degree $S(R_i, R_j)$. The attraction is also based on the distance between $R_i$ and $R_j$ and is stronger when the distance is longer. If $R_i$ and $R_j$ have the identical labels, $\alpha$ is a positive constant. If $R_i$ and $R_j$ do not have the identical labels, $\alpha$ is 0. If either one or both of the feature vectors are not provided with a label, $\alpha$ is 0.

In the example of this embodiment, if the foreign language proficiency levels of $R_i$ and $R_j$ are the same, a is a positive constant. If the foreign language proficiency levels of $R_i$ and $R_j$ are different, $\alpha$ is 0. Accordingly, a strong attraction acts between feature vectors having the identical labels.

The repulsion between $R_i$ and $R_j$ is based on the distance between $R_i$ and $R_j$ and is stronger when the distance is shorter. The repulsion based on the inverse of the distance between $R_i$ and $R_j$ eliminates collision of $R_i$ and $R_j$. One feature vector in a feature space receives forces from all the other feature vectors existing in the feature space. Every feature vector in the feature space receives the above-described attractions and repulsions.

After calculating attractions and repulsions between feature vectors (S603), the potential calculation unit 112 calculates the energy of the feature space (S604). The force $f(R_i)$ acting on the feature vector $R_i$ is expressed by the following formula (5) with the sum of the forces defined as described above:

$$f(R_i) = \Sigma f_a(R_i, R_j) v(R_j, R_i) + \Sigma f_r(R_i, R_j) v(R_j, R_i) \tag{b}$$

In the formula (5), the sum is calculated using all $R_j$ other than $R_i$; and $v(R_i, R_j)$ is a unit vector directed from $R_i$ toward $R_j$ and defined by the following formula (6):

$$v(R_j, R_i) = \frac{R_j - R_i}{\|R_j - R_i\|} \tag{6}$$

The gross potential energy E in the feature space can be defined by the following formula (7) with the sum of the forces:

$$E = \Sigma \|f(R_i)\|^2 \tag{7}$$

In the formula (7), the sum is calculated using all feature vectors and $\|f(R_i)\|$ is the size of the vector $f(R_i)$. As indicated by the formula (7), the potential energy E is determined from the absolute values of the forces on the feature vectors and the total sum of the absolute values of the forces represents the potential energy E. The potential calculation unit 112 outputs the forces $f(R_i)$ given to the individual feature vectors and the gross potential energy E in the feature space (S605).

Figure 8:
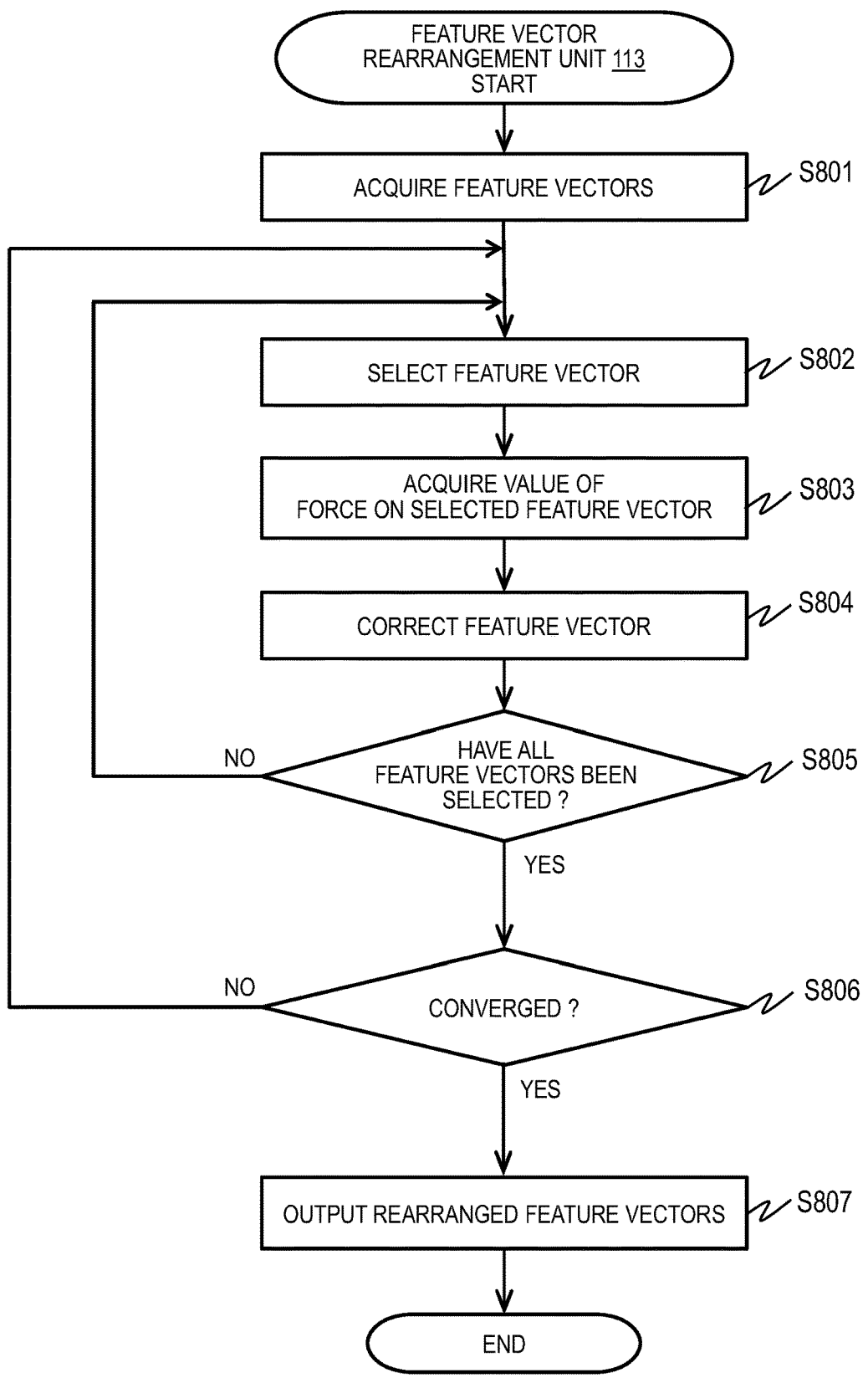
FIG. 8 is a flowchart of an example of feature vector rearrangement processing in Embodiment 1.

FIG. 8 is an outline flowchart of an example of feature vector rearrangement processing. The feature vector rearrangement unit 113 reconfigures the feature space by rearranging the feature vectors in the feature space based on the calculation result of the potential calculation unit 112 so that the potential energy E is minimized.

The feature vector rearrangement unit 113 acquires a plurality of feature vectors generated by the feature extraction unit 111 (S801). The plurality of feature vectors are stored in the memory 106, for example. Next, the feature vector rearrangement unit 113 selects the first feature vector $R_i$ from the entire feature vectors (S802).

Next, the feature vector rearrangement unit 113 requests the potential calculation unit 112 to calculate the force $f(R_i)$ acting on the selected $R_i$ and acquires the result. All the other feature vectors are in the states before the later-described correction.

Next, the feature vector rearrangement unit 113 corrects (relocates) the feature vector $R_i$ using the following formula (8). In the formula (8), step is a parameter to adjust the magnitude of correction and is a predetermined constant in this example.

$$R_i \leftarrow R_i + \text{step} \times \frac{f(R_i)}{\|f(R_i)\|} \tag{8}$$

A feature vector indicates a position (coordinates) in a feature space. Accordingly, correcting a feature vector corrects the position of the feature vector. The formula (8) is an example of correcting a feature vector and the feature vector can be corrected in accordance with a different formula. The amount of correction for a feature vector can be proportional to the absolute value of the force acting on the feature vector.

Next, the feature vector rearrangement unit 113 determines whether all feature vectors have been corrected with this loop of S802 to S805 (S805). If some uncorrected (unselected) feature vector exists (S805: NO), the feature vector rearrangement unit 113 returns to Step S802 and selects the next unselected feature vector for the newly started loop (S802).

The feature vector rearrangement unit 113 requests the potential calculation unit 112 to calculate the force acting on the newly selected feature vector (S803). If some corrected feature vector exists, the force acting on the selected feature vector $R_i$ from the corrected feature vector is calculated based on the corrected value. The potential calculation unit 112 calculates the force acting on the newly selected feature vector based on the corrected feature vectors and uncorrected feature vectors (if any).

If correction of all feature vectors has been completed with this loop (S805: YES), the feature vector rearrangement unit 113 determines the extent of convergence of the feature vectors (the positions thereof) in the feature space (S806). For example, expressing all feature vectors after the correction of the latest loop as $\{R_i\}$ and all feature vectors immediately before the correction of the latest loop as $\{R_i^o\}$, the feature vector rearrangement unit 113 compares $\{R_i\}$ with $\{R_i^o\}$ and determines whether the feature vectors have been converged based on the corrected amount.

For example, the corrected amount can be calculated by $\Sigma \|R_i - R_i^o\|$. If the corrected amount is larger than a predetermined threshold, the feature vector rearrangement unit 113 returns to Step S802 and continues the calculation. If the corrected amount is equal to or smaller than the threshold, the feature vector rearrangement unit 113 determines that the feature vectors have been converged and outputs all the rearranged feature vectors (S807).

As understood from the above, the feature vector rearrangement unit 113 rearranges the feature vectors so that the potential energy E will be in the range from the smallest value to a predetermined value. The threshold can be a predetermined value of 0 or a positive number; the threshold of 0 means that the converged state has the smallest potential energy (0).

The corrected amount may be expressed using potential energy (total sum of the absolute values of the forces). The feature vector rearrangement unit 113 can determine the extent of convergence by comparing the difference between the potential energy before correction and the potential energy after correction with a threshold. Alternatively, the feature vector rearrangement unit 113 may determine that the feature vectors have been converged when the potential energy E has become equal to or smaller than the threshold.

As described above, rearranging feature vectors moves feature vectors labeled the same close to one another. This processing corrects feature vectors generated from data having large variations into more appropriate vectors in accordance with the labels. Furthermore, the rearranging feature vectors moves feature vectors having high similarity close to one another. As a result, the feature vectors are corrected more appropriately in accordance with not the labels but the characteristics owned by the feature vectors. The rearranging feature vectors does not need to depend on the similarity.

Figure 9:
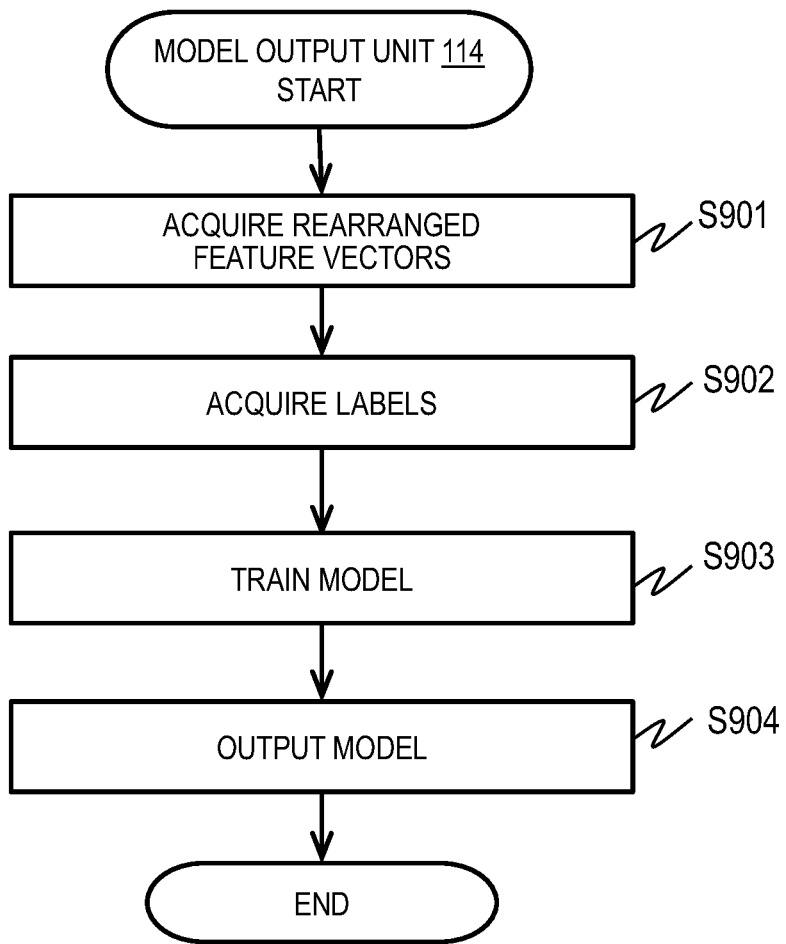
FIG. 9 is a flowchart of an example of model output processing in Embodiment 1.

FIG. 9 is an outline flowchart of an example of model output processing. In the following, an example that uses the rearranged feature vectors as training data for the model is described. The model output unit 114 acquires feature vectors rearranged by the feature vector rearrangement unit 113 (S901). The rearranged feature vectors are stored in the memory 106, for example.

Next, the model output unit 114 acquires the state labels acquired by the model generation data acquisition unit 100 from the biological database 107 (S902). The state labels are stored in the memory 106, for example. In this example, all the rearranged feature vectors are provided with labels of right answers. The model output unit 114 trains the model based on the rearranged feature vectors and their state labels (S903). The model receives the rearranged feature vectors and outputs state labels. The model output unit 114 updates the parameters of the model based on the difference between the state labels output from the model and the labels of the right answers.

It is sufficient that the model be based on an existing machine learning algorithm. The model can be a support vector machine based on the margin maximization principle, linear discriminant analysis, super logistic regression, logistic regression, or a neural network, for example. The model output unit 114 outputs a model trained (generated) as described above (S904).

The model output unit 114 may visualize the rearranged feature vectors. For example, the model output unit 114 reduces the dimensions of the high-dimensional feature vectors to two or three dimensions using a dimensionality reduction technique to visualize the feature vectors. The dimensionality reduction technique can be principal component analysis (PCA) or linear discriminant analysis (LDA), for example. In addition, the model output unit 114 may visualize the feature vectors before being rearranged together with the rearranged feature vectors.

Figure 10A:
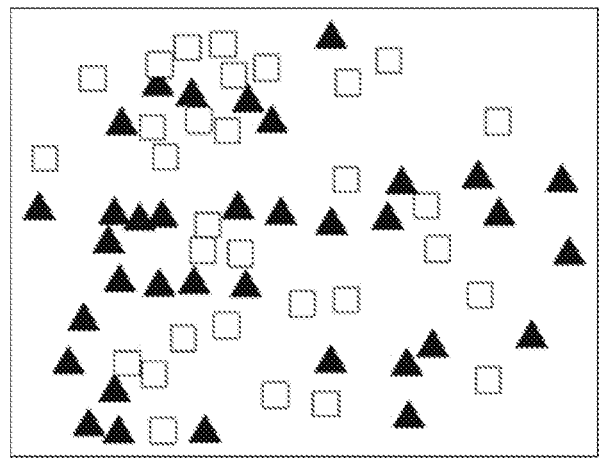
FIG. 10A is an example where feature vectors before being rearranged in Embodiment 1 are visualized in two dimensions.
Figure 10B:
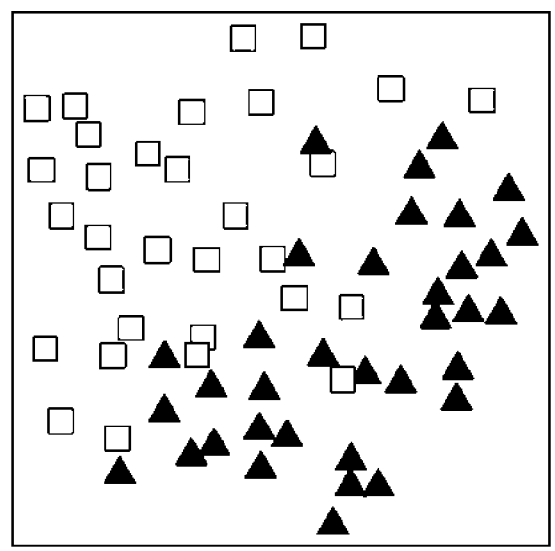
FIG. 10B is an example where feature vectors after being rearranged in Embodiment 1 are visualized in two dimensions.

FIG. 10A is an example of visualized feature vectors before being rearranged and FIG. 10B is an example of visualized rearranged feature vectors. In FIGS. 10A and 10B, filled triangles represent feature vectors with high foreign language proficiency and blank squares represent feature vectors with low foreign language proficiency. As understood from FIGS. 10A and 10B, rearrangement of feature vectors moves feature vectors provided with the identical labels close to one another, decreasing the spread thereof to gather the feature vectors in a smaller area.

Rearranged feature vectors with state labels (of right answers) can be used as a model, instead of training data for the model. The model output unit 114 acquires rearranged feature vectors (S901), acquires the state labels thereof (S902), and outputs the feature vectors with state labels (the feature space) after completion of rearrangement as a model (S904). In a broad sense, this rearranging the feature vectors to generate a model is machine learning of the model.

Next, processing to analyze unlabeled biological data using a generated model is described. In the following, an example using rearranged feature vectors as a model is described. The input data acquisition unit 115 acquires biological data to be analyzed. Next, the input data feature extraction unit 116 extracts a feature vector from the input data to be analyzed. The input data feature extraction unit 116 performs Steps S301 to S304 in FIG. 3 to calculate an input feature vector.

The input feature vector rearrangement unit 118 inputs the input feature vector to the feature space of the model. The feature space includes rearranged feature vectors. The input feature vector rearrangement unit 118 relocates the input feature vector within the feature space so that the input feature vector have smaller potential energy.

At this step, only the input feature vector is relocated (corrected) and the other feature vectors are fixed. Reducing the potential energy of the input feature vector means the same as reducing the potential energy of the feature space.

The input feature vector rearrangement unit 118 instructs the input potential calculation unit 117 to calculate the potential energy of the input feature vector. The label of the feature vector to be analyzed is unidentified and therefore, a in the formula (3) is 0.

If the calculated potential energy is larger than the threshold, the input feature vector rearrangement unit 118 corrects (moves) the input feature vector in accordance with the formula (8). The input feature vector rearrangement unit 118 repeats correcting the input feature vector and calculating the potential energy until the potential energy of the input feature vector becomes equal to or smaller than the threshold.

The input feature vector rearrangement unit 118 may calculate the force applied to the input feature vector and repeat correcting the input feature vector until the absolute value of the force becomes equal to or smaller than the threshold. Since the absolute value of the force represents the potential energy as described above, the determination with reference to the absolute value of the force means the same as the determination with reference to the potential energy.

Correcting only the input feature vector saves the time for the rearrangement processing. Unlike this configuration, the input feature vector rearrangement unit 118 may correct all the feature vectors in the feature space, inclusive of the input feature vector, as described with reference to FIGS. 8 and 6. As described with reference to FIG. 8, the input feature vector rearrangement unit 118 repeats correcting all feature vectors until the potential energy of the feature space becomes equal to or smaller than a predetermined value. The specific numerical value to be used to determine the completion of rearrangement (convergence) can be any one of the above-described examples.

Using rearranged feature vectors as a model leads to shorter rearrangement processing for the analysis. Unlike this configuration, the input feature vector rearrangement unit 118 may use feature vectors before being rearranged as a model. Such a configuration allows omission of the generation of a model before start of the analysis. The input feature vector rearrangement unit 118 rearranges all feature vectors including the input feature vector in the feature space as described with reference to FIGS. 6 and 8.

Figure 11:
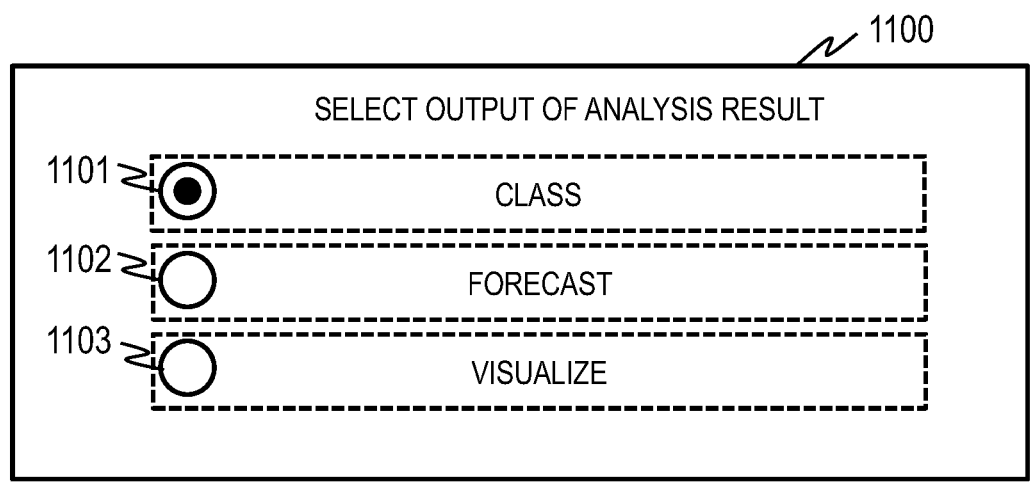
FIG. 11 is an example of an analysis result output selection screen in Embodiment 1.

The analysis result output unit 119 acquires the feature vectors calculated by the input feature vector rearrangement unit 118. The analysis result output unit 119 outputs an analysis result based on the feature vectors. For example, FIG. 11 is an analysis result output selection screen 1100 to be displayed on the touch panel 103. The analysis result output selection screen 1100 provides selections of classification result 1101, forecast result 1102, and visualized result 1103 to the user.

When Class 1101 is selected, the analysis result output unit 119 displays the state label for the input feature vector relocated by the input feature vector rearrangement unit 118. The analysis result output unit 119 determines the state label (class) for the relocated input feature vector by using a k-nearest neighbor algorithm, for example. In this embodiment, the class 1101 provides the foreign language proficiency level of the analyzed person.

When Forecast 1102 is selected, the analysis result output unit 119 displays feature vectors within a predetermined distance from the relocated input feature vector or feature vectors from the closest feature vector to the n-th closest feature vector together with their state labels. The user can forecast the future of the input feature vector of the analyzed person with reference to the displayed feature vectors and the state labels.

Figure 12:
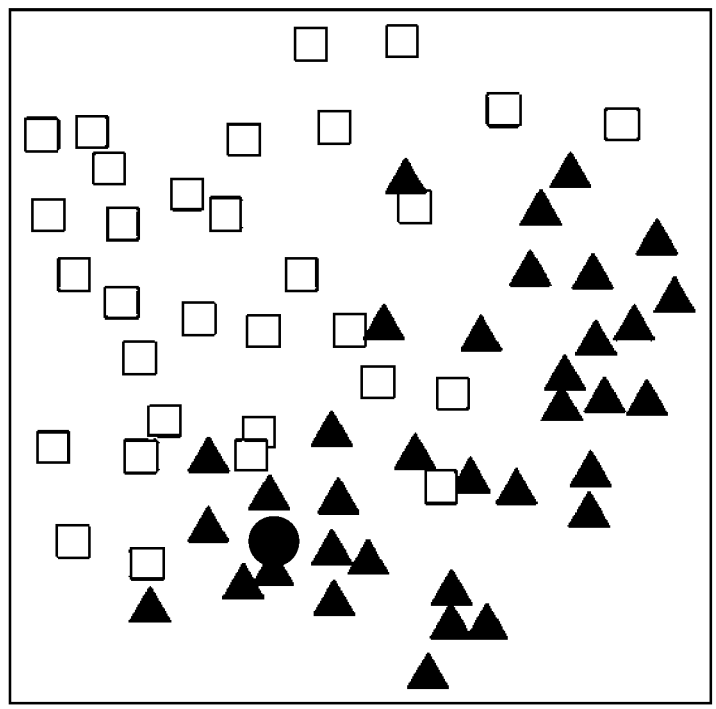
FIG. 12 is an example where an input feature vector and a model in Embodiment 1 are visualized in two dimensions.

When Visualize 1103 is selected, the analysis result output unit 119 reduces the dimensions of the input feature vectors and the other feature vectors with labels to two or three dimensions by a dimensionality reduction technique to visualize the vectors. For example, FIG. 12 is an example where feature vectors are visualized in a classification task of the input feature vector to be analyzed. The filled circle represents the input feature vector. The user can determine that the input feature vector is labeled as filled triangle.

As described above, the model to be used to analyze an input feature vector can be based on an existing machine learning algorithm. In that case, the processing of the input feature vector rearrangement unit 118 is omitted. The analysis result output unit 119 inputs an input feature vector to the model to receive a label as an output.

In summary, the biological data analysis system 101 of this embodiment generates feature vectors from biological data and defines the potential energy of the feature space so that the attractions between feature vectors having identical state labels are larger. The biological data analysis system 101 rearranges the feature vectors so that the potential energy becomes smaller. The rearranged feature vectors are used to more accurately infer the label of the feature vector to be analyzed.

Embodiment 2

Embodiment 1 defines the potential (force) so that the attraction between feature vectors having identical labels is larger. This embodiment defines potential energy so that the attraction between feature vectors successive in a time series is larger. For example, a in the formula (3) can be a positive constant if two feature vectors are successive in a time series and can be 0 if they are not successive in the time series In the following, an example where the state labels represent human emotions is described. The biological database 107 stores time-series biological signals of a plurality of persons. For example, the biological database 107 stores a plurality of time-series biological signals in a specified period for each person. Furthermore, each person in the period is provided with a state label representing an emotion.

The model generation data acquisition unit 110 acquires time-series biological signals detected from one person in a specified period. The model generation data acquisition unit 110 further acquires the emotion label of the person in the period. The feature extraction unit 111 divides the specified period to a plurality of sub periods and generates feature vectors from the time-series biological signals in the individual sub periods. As a result, a time series of feature vectors are generated. Each feature vector is provided with the above-described emotion label.

The feature vector rearrangement unit 113 places the time-series feature vectors in the feature space and rearranges those feature vectors so that the potential energy (the forces applied to the feature vectors) becomes smaller, as described in Embodiment 1. The potential calculation unit 112 calculates the forces between feature vectors and the potential energy as described in Embodiment 1. In the calculation, a in the formula (3) is a positive constant if two feature vectors are successive in the time series and is 0 if they are not successive.

The model generation data acquisition unit 110, the feature extraction unit 111, and the feature vector rearrangement unit 113 perform the above-described processing on biological data of each person. As a result, a plurality of pairs of a time series of feature vectors and a label are generated.

These can be used as training data for the model. The model determines a state label based on the trajectory of the time-series feature vectors, for example.

The input data feature extraction unit 116 generates a time series of feature vectors from the data to be analyzed, like the feature extraction unit 111. The input feature vector rearrangement unit 118 rearranges the time-series feature vectors, like the feature vector rearrangement unit 113. The calculation of the input potential calculation unit 117 is the same as the calculation of the potential calculation unit 112.

Figure 13:
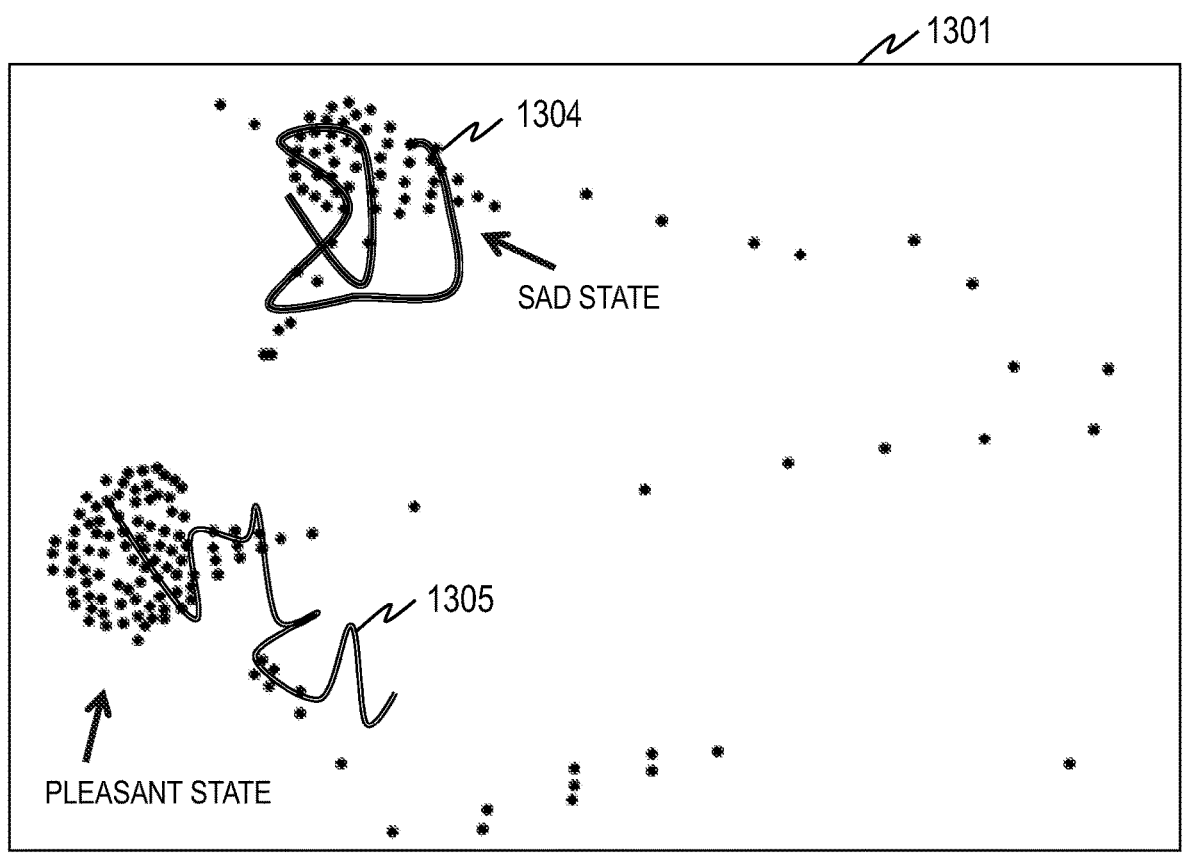
FIG. 13 is an example of visualized trajectories of feature vectors in Embodiment 2.

The analysis result output unit 119 inputs the rearranged time-series input feature vectors to the model and acquires an output label. The analysis result output unit 119 provides a trajectory of the time-series input feature vectors in visualizing the analysis result of the input data. FIG. 13 is an example of an image generated by the analysis result output unit 119. FIG. 13 is an image 1301 for the user to evaluate an emotional interaction between two persons.

The image 1301 includes analysis results of biological data of two persons in the same period. Dots represent rearranged feature vectors. The image 1301 includes a trajectory 1304 of feature vectors of a person A and a trajectory 1305 of feature vectors of a person B. The inferred state of the person A is a sad state and the inferred state of the person B is a pleasant state. It can be evaluated that there is no emotional interaction between the two persons.

As described above, this embodiment defines the force (potential) so that the attraction between feature vectors successive in a time series is larger and rearranges feature vectors of different time points. This configuration enables analysis of the trajectory of the feature vectors. Furthermore, an emotional interaction among a plurality of persons can be analyzed by analyzing biological data of the persons in the same period.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A computer-implemented model generation system for generating a machine learning model trained to infer an internal state of a user, such as an emotion or an understanding level, from an input biological data, the model generation system comprising:
a biological information measuring device for measuring biological information of the user;
a storage device configured to store a biological database comprising biological data acquired by the biological information measuring device, wherein the biological data is time-series data on a biological indicator for representing the internal state of the user in a specified time period, and wherein the biological data is expressed by a vector of a plurality of numerical components;
a processor configured to operate in accordance with command codes stored in the storage device, wherein the processor is configured to:
perform feature extraction processing to extract features from the biological data acquired from the storage device;
calculate a plurality feature vectors, wherein each feature vector is provided with one or more labels indicating an internal state, such as an emotion or an understanding level, wherein a label is a class or a numerical value,
place the plurality of feature vectors in a feature space, wherein each feature vector represents a position comprising coordinates in the feature space,
calculate attractions between the feature vectors based on one or more predetermined relationships indicating a degree of similarity between the feature vectors,
calculate repulsions between the feature vectors based on one or more distances between the feature vectors in the feature space,
determine forces among the plurality of feature vectors from the calculated attractions and repulsions between the feature vectors,
calculate a potential energy of the feature space based on a summation of the forces between the feature vectors,
rearrange the plurality of feature vectors to reduce the potential energy of the feature space determined by the forces among the plurality of feature vectors by moving feature vectors having identical labels or feature vectors having similarity degrees above a predetermined threshold close to one another in the feature space such that the distance between the moved feature vectors is reduced, and
generate a machine learning model using at least a part of the plurality of rearranged feature vectors as training data for training the machine learning model to infer a label of an input feature vector for data analysis;
wherein the processor executes a dimensionality reduction technique to reduce the dimensions of the feature vectors to two or three dimensions, such that the model may visualize the rearranged feature vectors and depict feature vectors having identical labels or feature vectors having similarity degrees above a predetermined threshold degrees by decreasing the area between these feature vectors.

2. The computer-implemented model generation system according to claim 1, wherein the feature vectors are provided with identical labels.

3. The computer-implemented model generation system according to claim 1, wherein the feature vectors are successive in a time series.

4. The computer-implemented model generation system according to claim 1, wherein the feature vectors provided with labels in the plurality of rearranged feature vectors are used as component data of a model to infer a label of an input feature vector.

5. The computer-implemented model generation system according to claim 1, wherein the processor is configured to recurrently rearrange the plurality of feature vectors until the potential energy is reduced to be in a range from a smallest value to a predetermined value.

6. The computer-implemented model generation system according to claim 4, wherein the model includes a feature space in which the feature vectors provided with labels are placed, and wherein the processor is configured to:
place the input feature vector in the feature space; and
relocate the input feature vector to reduce the potential energy of the feature space.

7. The computer-implemented model generation system according to claim 1,
wherein the plurality of feature vectors includes an input feature vector to be analyzed, and
wherein the processor is configured to:
infer a label for the input feature vector from relationships with the other feature vectors after rearranging the plurality of feature vectors; and
output the inferred label for the input feature vector.

8. A method for generating a machine learning model trained to infer an internal state of a user, such as an emotion or an understanding level, from an input biological data the method comprising:
performing feature extraction processing to extract features from biological data acquired from the user;
calculating a plurality feature vectors, wherein the biological data is time-series data on a biological indicator for representing the internal state of the user, such as an emotion or an understanding level, in a specified time period, and each feature vector is provided with one or more labels indicating an internal state, wherein a label is a class or a numerical value;
placing the plurality of feature vectors in a feature space, wherein each feature vector represents a position comprising coordinates in the feature space;
calculating attractions between the feature vectors based on one or more predetermined relationships indicating a degree of similarity between the feature vectors;
calculating repulsions between the feature vectors based on one or more distances between the feature vectors in the feature space;
determining forces among the plurality of feature vectors from the calculated attractions and repulsions between the feature vectors;
calculating a potential energy of the feature space based on a summation of the forces between the feature vectors;
rearranging the plurality of feature vectors to reduce the potential energy of the feature space determined by the forces among the plurality of feature vectors by moving feature vectors having identical labels or feature vectors having similarity degrees above a predetermined threshold close to one another in the feature space such that the distance between the moved feature vectors is reduced; and generating a machine learning model using at least a part of the plurality of rearranged feature vectors as training data for training the machine learning model to infer a label of an input feature vector for data analysis, wherein the processor executes a dimensionality reduction technique to reduce the dimensions of the feature vectors to two or three dimensions, such that the generated machine learning model may visualize the rearranged feature vectors and depict feature vectors having identical labels or feature vectors having similarity degrees above a predetermined threshold by decreasing the area between these feature vectors.

9. The computer-implemented model generation system according to claim 1, wherein the plurality of feature vectors includes feature vectors (Ri, Rj), and wherein the processor calculates an attraction $f_a(R_i, R_j)$ according to a formula defined as:

$$f_a(R_i, R_j) = \frac{s(R_i, R_j) \times \|R_i - R_j\|^2}{k} + \alpha,$$

where c and k are predetermined constants, $s(R_i, R_j)$ is a similarity degree between $R_i$ and $R_j$, and $\alpha$ is a constant based on $R_i$ and $R_j$.

10. The computer-implemented model generation system according to claim 1, wherein the plurality of feature vectors includes feature vectors (Ri, Rj), and wherein the processor calculates a repulsion $f_r(R_i, R_j)$ according to a formula defined as:

$$f_r(R_i, R_j) = \frac{ck^2}{\|R_i - R_j\|}.$$

11. The method for generating a machine learning model trained to infer an internal state of a user according to claim 8, wherein the plurality of feature vectors includes feature vectors (Ri, Rj), and wherein the processor calculates an attraction $f_a(R_i, R_j)$ according to a formula defined as:

$$f_a(R_i, R_j) = \frac{s(R_i, R_j) \times \|R_i - R_j\|^2}{k} + \alpha,$$

where c and k are predetermined constants, $s(R_i, R_j)$ is a similarity degree between $R_i$ and $R_j$, and $\alpha$ is a constant based on $R_i$ and $R_j$.

12. The method for generating a machine learning model trained to infer an internal state of a user according to claim 8, wherein the plurality of feature vectors includes feature vectors (Ri, Rj), and wherein the processor calculates a repulsion $f_r(R_i, R_j)$ according to a formula defined as:

$$f_r(R_i, R_j) = \frac{ck^2}{\|R_i - R_j\|}.$$

* * * * *